(12) United States Patent
Iwazaki et al.

(10) Patent No.: US 7,555,190 B2
(45) Date of Patent: Jun. 30, 2009

(54) OPTICAL FIBER FERRULE RETAINER

(75) Inventors: Hiroyuki Iwazaki, Saitama (JP); Zhongtao Ge, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 12/200,464

(22) Filed: Aug. 28, 2008

(65) Prior Publication Data

US 2009/0080850 A1  Mar. 26, 2009

(30) Foreign Application Priority Data

Sep. 21, 2007 (JP) ............... 2007-244916
Sep. 21, 2007 (JP) ............... 2007-244917

(51) Int. Cl.
*G02B 6/00* (2006.01)
*G01B 9/02* (2006.01)

(52) U.S. Cl. ............... 385/134; 385/85; 356/450; 356/496

(58) Field of Classification Search ............... 385/85, 385/134, 136; 356/450, 496, 498, 510
See application file for complete search history.

(56) References Cited

U.S. PATENT DOCUMENTS 5,917,595 A * 6/1999 Norland et al. ............ 356/450
5,982,533 A * 11/1999 Dominique ............... 359/379
6,947,149 B2 * 9/2005 Kobayashi et al. ........ 356/496
7,173,710 B2 * 2/2007 Kobayashi et al. ........ 356/450
2003/0227634 A1 12/2003 Kobayashi et al.

FOREIGN PATENT DOCUMENTS

GB       2 397 895 A    8/2004
JP       2004-184686    7/2004
JP       2005-69697 A   3/2005

* cited by examiner

*Primary Examiner*—Hemang Sanghavi
(74) *Attorney, Agent, or Firm*—Birch, Stewart, Kolasch & Birch, LLP

(57) ABSTRACT

An optical fiber ferrule retainer, for retaining a ferrule in a state in which the ferrule is inserted into a ferrule insertion hole in an axial direction of the ferrule insertion hole, comprises: a retainer base part; and a retention member replaceably attached to the retainer base part. The retention member comprises: a tubular sleeve part and a fixing part fixed to the retainer base part; the ferrule insertion hole; a split groove formed in an axial direction of the ferrule insertion hole or in a circumferential direction orthogonal to the axial direction; and a press part that is displaced to be able to press a peripheral surface of the ferrule with a partial inner face of the ferrule insertion hole defined by the split groove. The retainer base part comprises an operation member that applies an external force for displacing the press part, and while the ferrule inserted is retained by pressing of the press part, the fixing part can be removed from the retainer base part to detachably replace the retention member.

10 Claims, 7 Drawing Sheets

OPTICAL FIBER FERRULE RETAINER

BACKGROUND OF THE INVENTION

1. Field of the Invention

This invention relates to an optical fiber ferrule retainer used to retain an optical fiber ferrule at a predetermined position in front of an object lens when the shape, etc., of the tip part of the optical fiber ferrule forming a part of an optical connector is analyzed using a microinterferometer (also called "interference microscope"), for example.

2. Description of the Related Art

An optical fiber used for optical communications is made up of a core having an outer diameter of about 10 μm, for example, and a clad layer having an outer diameter of about 125 μm, for example, provided on the outer periphery of the core. An optical connector is installed at a connection end part to connect optical fibers.

The optical connector includes an optical fiber ferrule (simply, called ferrule) for retaining and fixing the end part of the optical fiber. The ferrule is implemented as a cylindrical part for retaining and fixing the end part of the optical fiber and the end part of the optical fiber is inserted into a through hole in the center and is fixed with an adhesive, etc., and then the tip end face is polished like a mirror surface. The tip end faces of two ferrules are abutted against each other with the optical connectors, whereby the two optical fibers retained on the ferrules of the optical connectors are optically connected.

As the tip end face of the ferrule, the tip end face polished to a flat face orthogonal to the optical axis and the tip end face polished to a flat face oblique to the optical axis are known. Recently, attention has been focused on an art of applying PC (physical contact) polishing to the tip end face for shaping the tip end face like a spherical surface so as to enhance the intimate contact property between the ferrule tip end faces as the tip end faces become elastically deformed by the press force when the tip end faces of the ferrules are abutted against each other.

By the way, to decrease the light loss accompanying connection of optical fibers by optical connectors, various specifications of high accuracy are defined for the ferrule according to JIS; for the ferrule subjected to the PC polishing, μm-order specifications of six items such as the dimension error of the curvature radius of the tip end face and the misregistration error between the apex of the spherical tip end face of the ferrule and the center of the core of the optical fiber (outer shape center of fiber).

A microinterferometer may be used to examine whether or not the manufactured ferrule matches the specifications. The microinterferometer observes an interference pattern provided by causing an object beam carrying phase information of the surface shape, refractive index profile, etc., of a minute specimen and reference light to interfere with each other and measures and analyzes the shape and change of the interference pattern, thereby providing the phase information of the specimen.

To examine the manufactured ferrule using such a microinterferometer, a ferrule retainer becomes necessary for retaining the ferrule to be examined with high position accuracy at a predetermined position ahead of and opposed to an object lens of the microinterferometer. Hitherto, a device described in JP-A-2005-69697 has been known as such a ferrule retainer:

The ferrule retainer in the related art described in JP-A-2005-69697 has a structure as illustrated in FIG. 7. FIG. 7 shows only the main body portion of a ferrule retainer 500 for retaining a ferrule 10 at a predetermined position in front of an object lens unit of a microinterferometer positioned on the left of FIG. 7.

The ferrule 10 forms a part of an optical connector and usually is housed in a plug of the optical connector. The ferrule 10 retains one end part of an optical fiber (not shown) of single mode type at the center of the outer diameter of a ferrule main body 11, and a holder 12 for housing the ferrule 10 in the plug of the optical connector is attached to the ferrule main body 11. The ferrule main body 11 is made of zirconia ceramic and has a tip end face subjected to PC polishing like a convex so as to easily come in intimate contact with the tip end face of a mated ferrule not shown.

The ferrule retainer 500 in the related art includes a base part 510 made of a circular plate-like member and the base part 510 has a notch 550 extending in an up and down direction and is divided partially into two portions opposed to each other with the notch 550 between, namely, a support portion 560 and a displacement portion 570. The support portion 560 includes a ferrule insertion hole 561 as a through hole extending in an axial direction in the center of the base part 510. The ferrule insertion hole 561 has an inner diameter of roughly the same dimension as the outer diameter of the ferrule 10, and the support portion 560 is adapted to support the ferrule 10 inserted into the ferrule insertion hole 561 on the inner face of the ferrule insertion hole 561.

The displacement portion 570 swings and is displaced with the thin portion of the lower part as a pivotal support point so that the gap of an opening end part (upper end part in the figure) of the notch 550 is expanded or shrunken, and has a press part 571 for retaining the ferrule 10 by pressing the tip part of the ferrule 10 with the displacement on the extension of the ferrule insertion hole 561. Although a mechanism for adjusting the displacement of the displacement portion 570 is not shown, a tip screw part of a displacement adjustment part (not shown) installed in the base part 510 is screwed into a screw hole 572 made in the tip part of the displacement portion 570 and when the displacement portion 570 is pulled into the support portion 560 by rotation operation of the displacement adjustment part, the press part 571 presses the peripheral surface of the ferrule 10 for retaining the ferrule 10.

However, the described ferrule retainer 500 involves the following problem: In the ferrule retainer 500 in the related art, an abrasion occurs in abrasion parts A and B in the ferrule insertion hole 561 and the press part 571 with repetitive retention operation of the ferrule 10, resulting in degradation of the retention accuracy of the ferrule 10.

That is, since the clearance between the inner face of the ferrule insertion hole 561 of the support portion 560 and the outer face of the ferrule 10 is set small so that the center positions match with accuracy, when the ferrule 10 is inserted into the ferrule insertion hole 561, the abrasion part A of the opening end part of the ferrule insertion hole 561 rubs against the outer face of the ferrule 10 and an abrasion occurs.

In the press part 571 of the displacement portion 570, when the displacement portion 570 is bent and is deformed so as to narrow the notch 550 for retention operation by fastening operation of an operation member, the abrasion part B of the inner face of the press part 571 is pressed against the peripheral surface of the ferrule 10 and rubs and an abrasion occurs.

If the retention accuracy of the ferrule 10 is degraded because of occurrence of an abrasion as mentioned above, finally it becomes necessary to replace the whole of the ferrule retainer 500 and arise in the inspection cost is incurred; this is a problem. Particularly, the measurement accuracy of end face inspection of the optical fiber ferrule using a microinterferometer is high, the component dimension accuracy required for the ferrule retainer as a measured article retention component is also high, the cost is increased with greater sophistication of working accuracy, material, working treatment, etc., and the inspection amount also grows with an increase in the use amount of optical fibers; it is importance to solve these problems.

It is therefore a first object of the invention to provide an optical fiber ferrule retainer capable of coping with an abrasion accompanying repeated use to maintain retention of a ferrule forming a part of an optical connector with high accuracy at a low cost.

The ferrule retainer 500 in the related art described above also involves the following problem: In the ferrule retainer 500 in the related art, the displacement portion 570 swings and is displaced with the thin portion of the lower part as a pivotal support point, the press part 571 presses the tip portion of the ferrule 10 for retaining the ferrule 10 and thus the optical axis of the tip part of the ferrule 10 is displaced so that it falls, the retention accuracy is degraded, and an error of the measurement accuracy grows, affecting the analysis result.

That is, the press part 571 is not displaced in parallel with the center line of the ferrule insertion hole with deformation of the displacement portion 570 and is displaced so that the press face is inclined with the center line, and the optical axis of the tip end face of the ferrule 10 is displaced so that it falls because of the effect of the press force. Consequently, the direction of the tip end face changes and the fiber positioned at the center of the ferrule 10 deviates from the center position of the ferrule tip end face to measure, affecting the analysis result.

An abrasion occurs in the ferrule insertion hole 561 and the press part 571 with repetitive retention operation of the ferrule 10, resulting in degradation of the retention accuracy of the ferrule 10; this is also a problem. That is, when the ferrule 10 is inserted into the ferrule insertion hole 561, they rub against each other and an abrasion occurs and an abrasion may occur in the press part 571 with press pressure in retaining the ferrule 10.

It is therefore a second object of the invention to provide an optical fiber ferrule retainer for pressing and retaining a ferrule forming a part of an optical connector with high accuracy without fall displacement of the optical axis of the tip part.

SUMMARY OF THE INVENTION

To accomplish the first object of the invention, an optical fiber ferrule retainer according to the first aspect of the invention is an optical fiber ferrule retainer for retaining a ferrule fixed to an end part of an optical fiber in a state in which the ferrule is inserted into a ferrule insertion hole for fixing the ferrule in an axial direction of the ferrule insertion hole, the optical fiber ferrule retainer comprising: a retainer base part; and a retention member replaceably attached to the retainer base part, wherein the retention member comprises: a tubular sleeve part and a fixing part fixed to the retainer base part, the tubular sleeve part and the fixing part being formed in one piece; the ferrule insertion hole formed piercing the sleeve part and the fixing part; a split groove formed in an axial direction of the ferrule insertion hole or in a circumferential direction orthogonal to the axial direction; and a press part that is displaced so as to be able to press a peripheral surface of the ferrule inserted into the ferrule insertion hole with a partial inner face of the ferrule insertion hole defined by the split groove, wherein the retainer base part comprises an operation member that applies an external force for displacing the press part of the retention member, and wherein while the ferrule inserted into the ferrule insertion hole is retained by pressing of the press part, the fixing part can be removed from the retainer base part so as to detachably replace the retention member.

Specifically, the retention member may comprise: the split groove formed toward the axial direction from an end part opposite to a ferrule insertion end part in the ferrule insertion hole; a plate-like displacement member provided continuously extending in a direction orthogonal to the axial direction of the ferrule insertion hole in the press part of one defined by the split groove; and the fixing part that is plate-like and is continuously provided extending in an opposite direction to the displacement member in the other part defined by the split groove, opposed to the press part, and a press external force parallel with the axial direction of the ferrule insertion hole by the operation member may act on an end face of the displacement member on the side of the sleeve part.

Specifically, the retention member may comprise: the split groove formed in a circumferential direction orthogonal to the axial direction in the proximity of an end opposite to an ferrule insertion end part in the ferrule insertion hole; a plate-like displacement member provided continuously extending in a direction orthogonal to the axial direction of the ferrule insertion hole in the press part defined by the split groove and positioned at an end part from the split groove; and the fixing part that is plate-like and is continuously provided extending in an opposite direction to the displacement member in the part opposed to the press part and not formed with the split groove, and a tension external force parallel with the axial direction of the ferrule insertion hole by the operation member may act on the end face of the displacement member on the side of the sleeve part.

Specifically, the retention member may comprise: the fixing part continuously provided in an end part opposite to an ferrule insertion end part in the ferrule insertion hole of the sleeve part; and the split groove formed toward the axial direction from the ferrule insertion end part of the sleeve part, and the sleeve part of one defined by the split groove may be formed in the press part, and a press external force in a direction orthogonal to the axial direction of the ferrule insertion hole by the operation member may act on the press part.

Specifically, the retention member may comprise the split groove formed toward the axial direction from an opposite end to an ferrule insertion end part in the ferrule insertion hole, and the sleeve part of one defined by the split groove may be formed in the press part and a press external force in a direction orthogonal to the axial direction of the ferrule insertion hole by the operation member acts on the press part, and the plate-like fixing part may be continuously provided in the other part defined by the split groove, opposed to the press part.

To accomplish the second object of the invention, an optical fiber ferrule retainer according to the second aspect of the invention is an optical fiber ferrule retainer for retaining a ferrule fixed to an end part of an optical fiber in a state in which the ferrule is inserted into a ferrule insertion hole for fixing the ferrule in an axial direction of the ferrule insertion hole, the optical fiber ferrule retainer comprising: a retainer main body having the ferrule insertion hole; and a plate-like clamp member, attached to the retainer main body, that retains a tip of the ferrule projected from the retainer main body, wherein the clamp member comprises: a retention hole opened on an extension of the ferrule insertion hole; a notch groove extending in two radiation directions from the retention hole with one end opened at an open end of one side of the clamp member and an opposite end closed at a closed end; a fixing part separated by the notch groove and fixed to the retainer main body; and a displacement part being opposed to the fixing part and displaced with the closed end portion of the notch groove as a center, wherein the retainer main body comprises a displacement adjustment part that adjusts a displacement amount of the displacement part, and wherein the displacement part comprises, in an inner peripheral part of the retention hole, a ferrule press part that moves toward or away from the inner peripheral part of the retention hole of the fixing part by action of the displacement adjustment part and presses the tip of the ferrule inserted into the ferrule insertion hole of the retainer main body from a direction orthogonal to an axial direction of the ferrule.

The clamp member may comprise a separate component that is replaceable and comes in contact with the ferrule.

At the time, the separate component may be a split sleeve in which a vertical split groove is formed in an axial direction in a part of a cylinder, and the split sleeve may be extended and placed in a portion of the ferrule insertion hole of the retainer main body.

The press force applying position to the displacement part by the displacement adjustment part may be a position leaning to the open end of the notch groove from the center position of the retention hole.

Further, in the clamp member, the displacement part and the fixing part may be joined through a thin part in the proximity of the open end of the notch groove and the displacement part can be displaced relative to the fixing part with the thin part as a center.

In the optical fiber ferrule retainers according to the first and second aspects of the invention, the cross-sectional shape of the ferrule insertion hole can be made the same circle as the cross-sectional shape of the ferrule. However, if the ferrule can be positioned, the cross-sectional shape is not limited to the circle and may be a square, a rhombus, or a polygon. In this case, the inner diameter of the ferrule insertion hole means the distance between the faces coming in contact with the outer peripheral surface of the ferrule and opposed to each other with the ferrule between.

DETAILED DESCRIPTION OF THE INVENTION

Embodiments of a ferrule retainer according to a first aspect of the invention will be discussed with the accompanying drawings.

Embodiment 1-1

Figure 1:
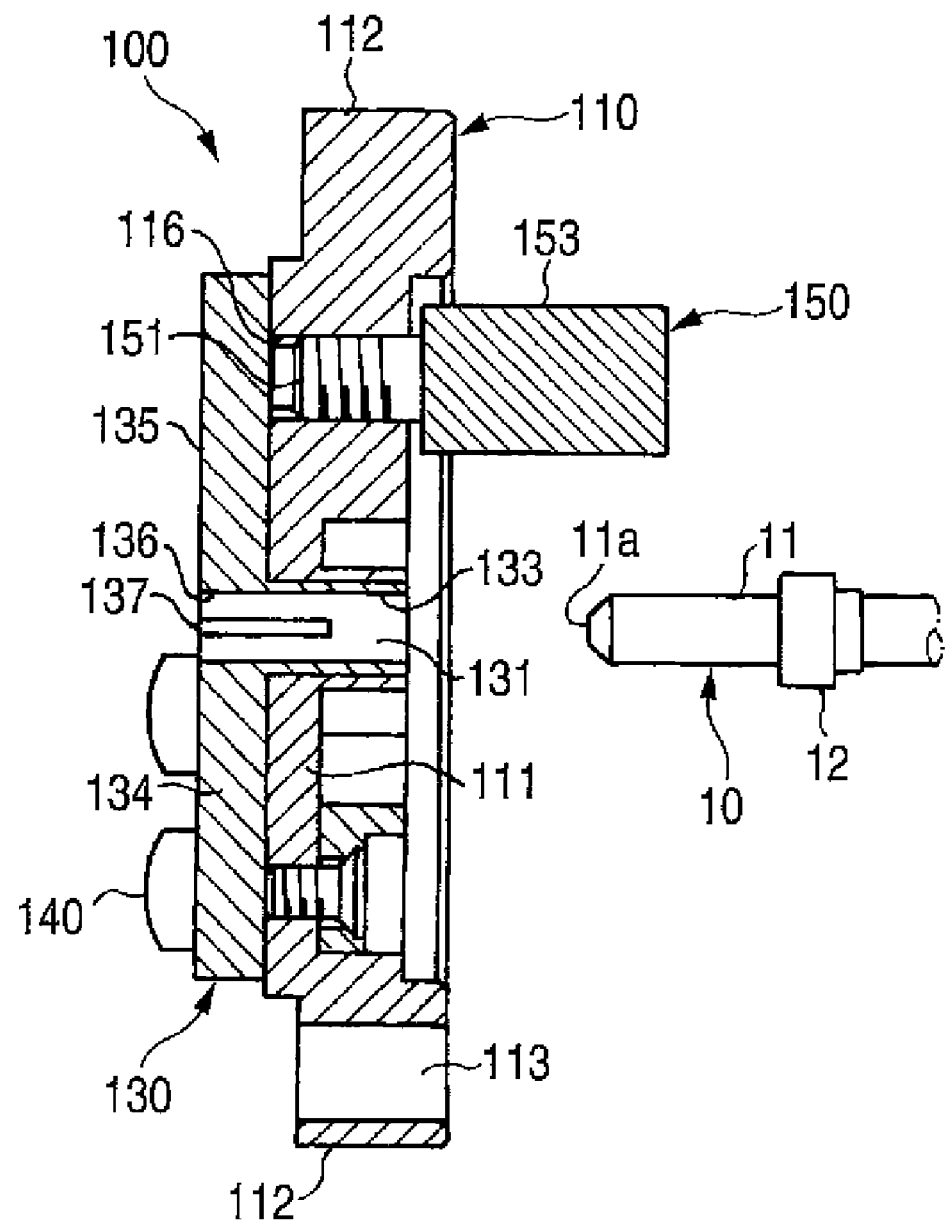
FIG. 1 is a sectional view of an optical fiber ferrule retainer according to embodiment 1-1 of the invention.
Figure 2:
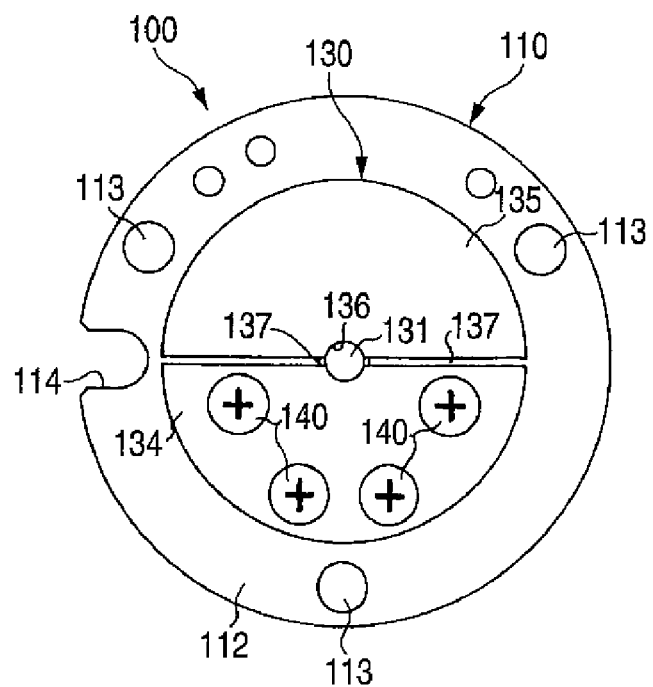
FIG. 2 is a front view of the optical fiber ferrule retainer shown in FIG. 1.
Figure 3:
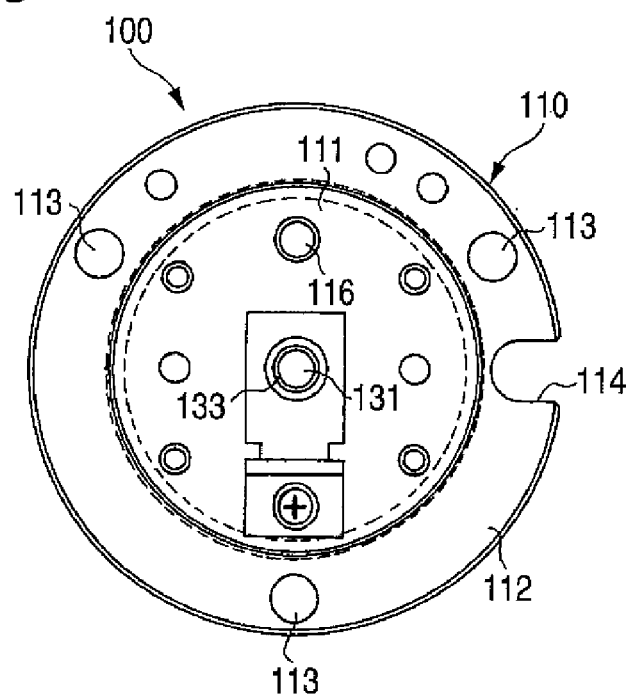
FIG. 3 is a rear view of the optical fiber ferrule retainer shown in FIG. 1.

FIG. 1 is a sectional view of an optical fiber ferrule retainer according to embodiment 1-1 of the invention, FIG. 2 is a front view of the optical fiber ferrule retainer, and FIG. 3 is a rear view of the optical fiber ferrule retainer.

A ferrule retainer 100 shown in the figures retains a ferrule 10 fixedly secured to an end part of an optical fiber shown in FIG. 1 at a predetermined position in front of an object lens unit of a microinterferometer not shown. The left of FIG. 1, namely, the front shown in FIG. 2 is a face attached to a microinterferometer, and the ferrule 10 is inserted from the right of FIG. 1, namely, the rear shown in FIG. 3. A configuration example of the microinterferometer is described in detail in JP-A-2005-69697. Therefore, refer to JP-A-2005-69697.

The ferrule 10 shown in FIG. 1 forms a part of an optical connector joined to a mated plug (not shown) through a sleeve (not shown); usually it is housed in a plug of the optical connector. The ferrule 10 retains one end part of an optical fiber (not shown) of single mode type at the center of the outer diameter of a ferrule main body 11, and a holder 12 for housing the ferrule 10 in the plug of the optical connector is attached to the ferrule main body 11. The ferrule main body 11 is made of zirconia ceramic and has a tip end face 11a subjected to PC polishing like a convex so as to easily come in intimate contact with the tip end face of a mated ferrule not shown, and the shape accuracy of the tip end face 11a is analyzed with the microinterferometer.

The ferrule retainer 100 of the embodiment includes a retainer base part 110 made of a circular plate-like member and a retention member 130 replaceably attached to the retainer base part 110 from the front, has a ferrule insertion hole 131 for fixing the ferrule at the center, and retains the ferrule 10 with the ferrule 10 inserted in the axial direction. The retainer base part 110 includes an operation member 150 (not shown in FIG. 3).

The retainer base part 110 has a disk part 111 in the center and an outer peripheral margin 112 shaped roughly like an annular ring, which are formed in one piece, and a disk-like rotation regulation plate (not shown) is attached to the center of the rear of the disk part 111.

As shown in FIGS. 2 and 3, the margin 112 includes tapped holes 113 (three in the figures) and a recess part 114 for positioning. Each tapped hole 113 is used for an attaching screw for attaching the ferrule retainer 100 to a microinterferometer, and the recess part 114 is formed for engagement with a positioning pin.

As shown in FIG. 1, the retention member 130 replaceably attached to the front of the retainer base part 110 has a tubular sleeve part 133 at the center and a plate-like fixing part 134 and displacement member 135 formed in one piece at one end of the sleeve part 133. The retention member 130 is assembled as the sleeve part 133 is fitted into the center of the retainer base part 110 and the fixing part 134 is fastened with setting screws 140.

The sleeve part 133, the fixing part 134, and the displacement member 135 of the retention member 130 are formed with the ferrule insertion hole 131 as a through hole in the axial direction. The ferrule insertion hole 131 has an inner diameter of roughly the same dimension as the outer diameter of the ferrule 10, and the sleeve part 133 is adapted to support the ferrule 10 inserted into the ferrule insertion hole 131 on the inner face of the ferrule insertion hole 131.

The retention member 130 has an expanding slot 137 formed extending in the axial direction of the ferrule insertion hole 131 in an end part opposite to a ferrule insertion end part (the right in FIG. 1) in the ferrule insertion hole 131 from the end part to an opposite end part, and is divided into two portions opposed to each other by the expanding slot 137 with the expanding slot 137 between. The expanding slot 137 not only divides the sleeve part 133, but also separates the fixing part 134 and the displacement member 135 up and down as it extends like a slit in a lateral direction (diametrical direction) as shown in FIG. 2.

The expanding slot 137 defines the partial inner face of the ferrule insertion hole 131 up and down as a press part 136 of the displacement member 135 of the upper portion (one) and the portion of the fixing part 134 of the lower portion (the other). The displacement member 135 provided in the orthogonal direction to the axial direction of the ferrule insertion hole 131 is formed continuously with the upper press part 136, whereby the upper press part 136 is displaced so that it can press the peripheral surface of the ferrule 10 inserted into the ferrule insertion hole 131 in response to displacement such that the displacement member 135 falls to the opposite side to the sleeve part 133 (the left in the figure).

This means that the displacement member 135 is formed displaceably so that the width of the expanding slot 137 narrows. When the ferrule 10 is inserted into the ferrule insertion hole 131, the press part 136 at the lower end of the displacement member 135 presses the tip portion of the ferrule 10 positioned at the front end part in the insertion direction of the ferrule insertion hole 131 in a direction roughly at right angle to the insertion direction of the ferrule 10 with the displacement and retains the ferrule 10 inserted into the ferrule insertion hole 131.

The other (lower) part defined so as to be opposed to the press part 136 by the expanding slot 137, namely, the fixing part 134 extends in the opposite direction to the displacement member 135 and is attached to the retainer base part 110 as it is fastened with the setting screws 140 (four in FIG. 2) from the front. According to this structure, the part opposed to the press part 136 is not displaced and acts so as to retain the peripheral surface of the ferrule 10 inserted into the ferrule insertion hole 131.

In the retainer base part 110, the operation member 150 is screwed into a tapped hole 116 formed at the rear position of the displacement member 135 of the upper part. The operation member 150 has a screw shaft 151 screwed into the tapped hole 116 and the tip of the screw shaft 151 passes through the tapped hole 116 and can abut against the rear of the displacement member 135 (end face on the side of the sleeve part 133) and can press it. A knob part 153 is provided on the back side of the screw shaft 151. A press external force parallel with the axial direction of the ferrule insertion hole 131 by the operation member 150 acts on the displacement member 135 with the fastening rotation operation of the knob part 153. An external force for displacing the press part 136 of the retention member 130 is given through displacing of the displacement member 135.

To facilitate operation of the operation member 150 or to stipulate the manipulated variable, the operation member 150 may be provided with an upright lever and the move range of the lever may be regulated to a clamp position and a release position by installing a pin, etc. For example, if the operation member 150 is largely operated in a state in which the ferrule 10 is not inserted into the ferrule insertion hole 131, it is feared that plastic deformation will occur in the portion of the expanding slot 137 and the displacement member 135 will not be restored to the former position, making it impossible to later insert the ferrule 10. A mechanism for regulating large operation of the operation member 150 is required. For a specific structure of the mechanism, refer to JP-A-2005-69697.

A tip opening of the ferrule insertion hole 131 (the left end part in FIG. 1) becomes an observation hole for observing the tip end face 11a of the ferrule 10 inserted into the ferrule insertion hole 131. When the ferrule retainer 100 is set in a microinterferometer, the opening (hole) is positioned at the front of the object lens unit.

As the press part 136 is displaced, the inner face of the press part 136 presses the peripheral surface (top surface) of the ferrule 10 inserted into the ferrule insertion hole 131, thereby fixedly retaining the ferrule 10 in the ferrule insertion hole 131. On the other hand, the fixing part 134 is detached from the retainer base part 110 and the retention member 130 is replaced in response to the abrasion degree of the inner face of the ferrule insertion hole 131 with repetitive retention of the ferrule 10.

The retainer base part 110 can be formed of a stainless material with no treatment (SUS303) as a material example; as a material example of the retention member 130, a hard stainless material (SUS440) is used and thermal treatment of quenching and tempering and surface treatment of electroless nickel plating need to be performed. If the retainer base part 110 and the retention member 130 are formed in one piece, the whole needs to be formed of a hard material and needs to be subjected to surface treatment and the cost is increased. This problem can also be solved by adopting the separate replacement structure as in the invention.

The ferrule retainer 100 of the embodiment retains the ferrule 10 as follows:

First, the operation member 150 is operated to the release position. At this time, the displacement member 135 is maintained in a no-displacement state, namely, in a state in which the spacing of the expanding slot 137 becomes constant over the full length.

Next, from the tip side of the ferrule 10, the ferrule 10 is inserted into the ferrule insertion hole 131 of the sleeve part 133 of the ferrule retainer 100 and is set. Since the inner diameter of the ferrule insertion hole 131 is formed as roughly the same size as the outer diameter of the ferrule 10, when the ferrule 10 is inserted into the ferrule insertion hole 131, the ferrule 10 is set at a predetermined position as a predetermined attitude with high accuracy.

Next, the operation member 150 is operated to the clamp position. At this time, the displacement member 135 is pressed by the operation member 150 and is displaced away from the front of the retainer base part 110. As the displacement member 135 is thus displaced, the press part 136 of the displacement member 135 presses the tip portion of the ferrule 10 inserted into the ferrule insertion hole 131 in a direction roughly at right angle to the insertion direction of the ferrule 10 and retains the ferrule 10 inserted into the ferrule insertion hole 131 so that the ferrule 10 is not detached.

To release the retention of the ferrule 10, the operation member 150 is operated in an opposite direction. At this time, the displacement member 135 pressed by the operation member 150 is released in response to a back move of the operation member 150 and is displaced toward the front of the retainer base part 110. As the displacement member 135 is thus displaced, the tip portion of the ferrule 10 pressed by the press part 136 of the displacement member 135 is released and it is made possible to detach the ferrule 10 from the ferrule insertion hole 131.

Embodiment 1-2

Figure 4:
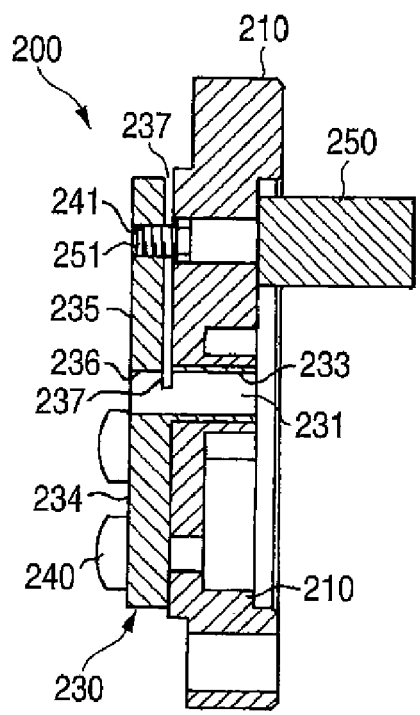
FIG. 4 is a sectional view of an optical fiber ferrule retainer according to embodiment 1-2 of the invention.

FIG. 4 is a schematic sectional view to show an optical fiber ferrule retainer according to embodiment 1-2 of the invention. A ferrule retainer 200 in the embodiment differs from the ferrule retainer of embodiment 1-1 in the form of expanding slot 237.

Specifically, the ferrule retainer 200 includes a retainer base part 210 and a retention member 230 as in embodiment 1-1, and the retention member 230 replaceably attached to the front of the retainer base part 210 has a tubular sleeve part 233 at the center and a fixing part 234 and a displacement part 235 formed in one piece at one end of the sleeve part 233. The retention member 230 is assembled as the sleeve part 233 is fitted into the center of the retainer base part 210 and the fixing part 234 is fastened with setting screws 240.

The sleeve part 233, the fixing part 234, and the displacement part 235 of the retention member 230 are formed with a ferrule insertion hole 231 as a through hole in the axial direction. The retention member 230 has an expanding slot 237 formed extending in a circumferential direction orthogonal to the axial direction of the ferrule insertion hole 231 at the back position of the displacement part 235 in the proximity of the end part opposite to the ferrule insertion end part (the right in FIG. 4) in the ferrule insertion hole 231. The expanding slot 237 has an extension between the retainer base part 210 and the displacement part 235, and the displacement part 235 is provided displaceably so that the width of the expanding slot 237 changes.

The expanding slot 237 defines the press part 236 in the partial inner face of the ferrule insertion hole 231 in the center of the displacement part 235. The plate-like displacement part 235 extends in the orthogonal direction to the axial direction of the ferrule insertion hole 231 from the press part 236 and is formed continuously. The plate-like fixing part 234 extending in an opposite direction to the displacement part 235 is formed continuously in the part wherein the expanding slot 237 is not formed, opposed to the press part 236.

A tension external force parallel with the axial direction of the ferrule insertion hole 231 acts on the end face of the displacement part 235 on the side of the sleeve part 233 by an operation member 250 installed in the retainer base part 210.

The operation member 250 adjusts the displacement of the displacement part 235 in response to the manipulated variable. A screw part 251 at the tip of the operation member 250 is screwed into a tapped hole 241 formed extending in the axial direction at the tip of the displacement part 235, and has a knob part 253 in the rear end part. The knob part 253 is fastened, whereby the screw part 251 is screwed into the tapped hole 241 of the displacement part 235 and gives an external force so as to draw the displacement part 235.

The press part 236 is displaced with the displacement operation of the displacement part 235 and the inner face of the press part 236 presses the peripheral surface (top surface) of the ferrule 10 inserted into the ferrule insertion hole 231, thereby fixedly retaining the ferrule 10 in the ferrule insertion hole 231. On the other hand, the fixing part 234 is detached from the retainer base part 210 and the retention member 230 is replaced in response to the abrasion degree of the inner face of the ferrule insertion hole 231 with repetitive retention of the ferrule 10.

The ferrule retainer 200 of the embodiment retains the ferrule 10 as follows:

When the operation member 250 is operated to a release position, the displacement part 235 is maintained in a state in which the spacing of the expanding slot 237 does not change, and the ferrule 10 is inserted into the ferrule insertion hole 231 and is set.

Next, when the operation member 250 is operated to a clamp position, the displacement part 235 is pulled by the operation member 250 and is displaced toward the front of the retainer base part 210. As the displacement part 235 is thus displaced, the press part 236 of the displacement part 235 presses the tip portion of the ferrule 10 inserted into the ferrule insertion hole 231 and retains the ferrule 10 so that the ferrule 10 is not detached. To release the retention of the ferrule 10, the operation member 250 is operated in an opposite direction, whereby the tip portion of the ferrule 10 pressed by the press part 236 of the displacement part 235 is released and it is made possible to detach the ferrule 10 from the ferrule insertion hole 231.

Embodiment 1-3

Figure 5:
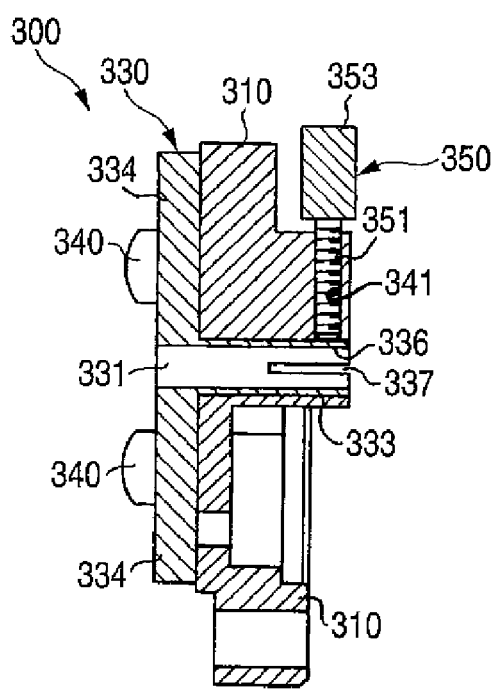
FIG. 5 is a sectional view of an optical fiber ferrule retainer according to embodiment 1-3 of the invention.

FIG. 5 is a schematic sectional view to show an optical fiber ferrule retainer according to embodiment 1-3 of the invention. A ferrule retainer 300 in the embodiment differs from the ferrule retainer of embodiment 1-1 in the form of expanding slot 337.

Specifically, the ferrule retainer 300 includes a retainer base part 310 and a retention member 330 as in the embodiment described above, and the retention member 330 replaceably attached to the front of the retainer base part 310 has a tubular sleeve part 333 at the center and a fixing part 334 formed in one piece for the entire perimeter of one end of the sleeve part 333. The retention member 330 is assembled as the sleeve part 333 is fitted into the center of the retainer base part 310 and the fixing part 334 is fastened with setting screws 340.

The sleeve part 333 and the fixing part 334 of the retention member 330 are formed with a ferrule insertion hole 331 as a through hole in the axial direction. In the retention member 330, the fixing part 334 is formed continuously in an end part opposite to a ferrule insertion end part (the right in FIG. 5) in a ferrule insertion hole 331 from the end part to an opposite end part, and the fixing part 334 has an expanding slot 337 formed extending in the axial direction of the ferrule insertion hole 331 in the ferrule insertion end part opposite to the fixing part 334 from the end part to an opposite end part. The retention member 330 is divided into two portions opposed to each other by the expanding slot 337 with the expanding slot 337 between.

The expanding slot 337 defines a part of the ferrule insertion hole 331, namely, the end part of the sleeve part 333 up and down as an upper (one) press part 336 and a lower (the other) fixing portion. A press external force in a direction orthogonal to the axial direction of the ferrule insertion hole 331 by an operation member 350 installed in the retainer base part 310 acts on the upper press part 336. The press part 336 can be displaced in the center direction by the press force and presses the peripheral surface of the ferrule 10 inserted into the ferrule insertion hole 331.

In the opposite end part of the ferrule insertion hole 331 where the expanding slot 337 is not formed, the fixing part 334 extends on the outer periphery in the direction orthogonal to the axial direction of the ferrule insertion hole 331 and is fastened with the setting screws 340 from the front for attachment to the retainer base part 310.

The operation member 350 adjusts the displacement of the press part 336 in response to the manipulated variable. A screw part 351 of the operation member 350 is screwed into a tapped hole 341 formed extending in the direction orthogonal to the axial direction toward the peripheral surface of the press part 336 in the retainer base part 310, and has a knob part 353 in the rear end part, and the tip of the screw part 351 can press the peripheral surface of the press part 336. The knob part 353 is fastened, whereby the screw part 351 is screwed into the tapped hole 341 of the retainer base part 310 and gives an external force so as to push the press part 336.

The press part 336 is displaced with the displacement operation and the inner face of the press part 336 presses the peripheral surface (top surface) of the ferrule 10 inserted into the ferrule insertion hole 331, thereby fixedly retaining the ferrule 10 in the ferrule insertion hole 331. On the other hand, the fixing part 334 is detached from the retainer base part 310 and the retention member 330 is replaced in response to the abrasion degree of the inner face of the ferrule insertion hole 331 with repetitive retention of the ferrule 10.

The ferrule retainer 300 of the embodiment retains the ferrule 10 as follows:

When the operation member 350 is operated to a release position, the press part 336 is maintained in a state in which the spacing of the expanding slot 337 does not change, and the ferrule 10 is inserted into the ferrule insertion hole 331 and is set.

Next, when the operation member 350 is operated to a clamp position, the press part 336 is pressed by the operation member 350 and is displaced. As the press part 336 is thus displaced, it presses the root portion of the ferrule 10 inserted into the ferrule insertion hole 331 and retains the ferrule 10 so that the ferrule 10 is not detached. To release the retention of the ferrule 10, the operation member 350 is operated in an opposite direction, whereby the ferrule 10 pressed by the press part 336 is released and it is made possible to detach the ferrule 10 from the ferrule insertion hole 331.

In the embodiment, the ferrule 10 inserted into the ferrule insertion hole 331 is retained in the root portion in the rear from the tip part, so that the analysis accuracy of a tip end face 11a becomes good as compared with the case where the ferrule 10 is pressed and retained in the tip portion as in embodiment 1-1. That is, to press the tip of the ferrule 10 by the press part 136 and retain the ferrule 10 as in embodiment 1-1, the tip end face 11a is displaced so that it falls because of the effect of the press force, and it is feared that the center position of the fiber at the center of the ferrule 10 may deviate, affecting a measurement error. However, to press and retain the ferrule 10 in the root portion at a distance to the rear as in embodiment 1-3, falling of the tip end face 11a with the pressing lessens, deviation of the center position of the fiber is small, the retention accuracy is high, and the measurement error lessens.

Embodiment 1-4

Figure 6:
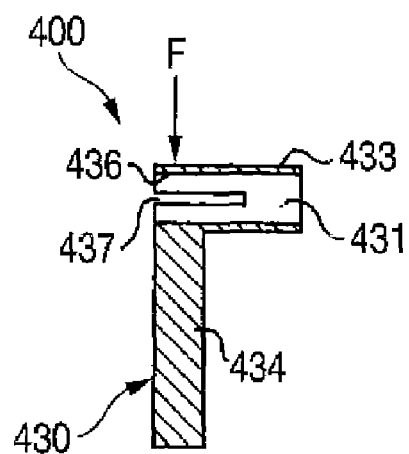
FIG. 6 is a sectional view of a retention member in an optical fiber ferrule retainer according to embodiment 1-4 of the invention.
Figure 7:
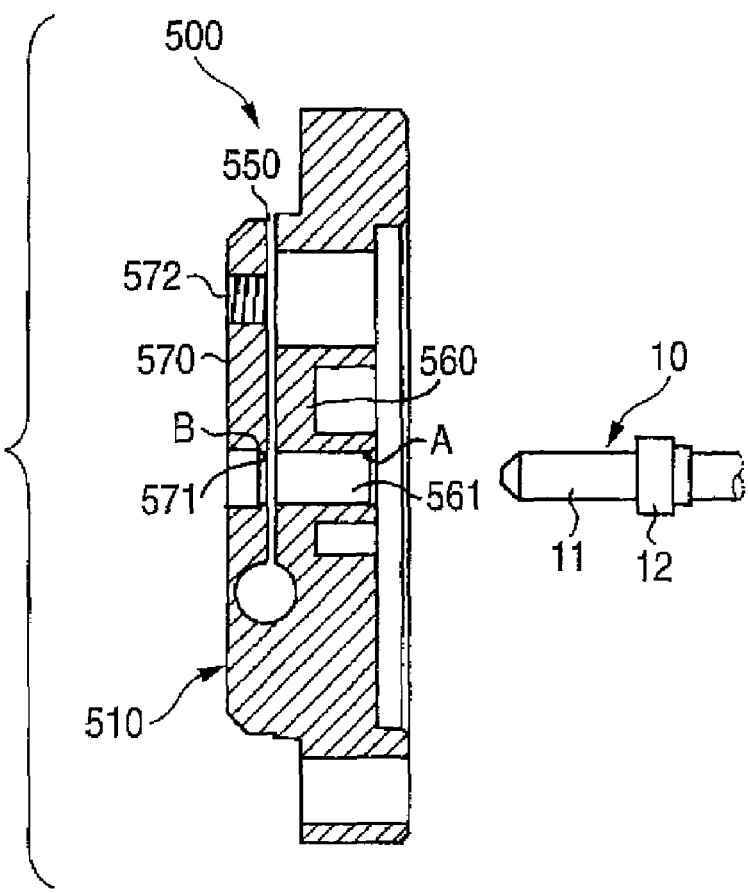
FIG. 7 is a sectional view of an optical fiber ferrule retainer according to a related art example.

FIG. 6 is a schematic sectional view to show a retention member in an optical fiber ferrule retainer according to embodiment 1-4 of the invention. A ferrule retainer 400 in the embodiment differs from the ferrule retainer of embodiment 1-1 in that a press force is caused to act so as to display a press part 436 directly.

In embodiment 1-4, a retention member 430 replaceably attached to the front of a retainer base part (not shown) has a tubular sleeve part 433 at the center and a fixing part 434 formed in one piece in the lower part of one end of the sleeve part 433. The retention member 430 is assembled as the sleeve part 433 is fitted into the center of the retainer base part and the fixing part 434 is fastened in a similar manner in FIG. 1.

The sleeve part 433 and the fixing part 434 of the retention member 430 are formed with a ferrule insertion hole 431 as a through hole in the axial direction. The retention member 430 has an expanding slot 437 formed extending in the axial direction of the ferrule insertion hole 431 in the end part opposite to the ferrule insertion end part (the right in FIG. 6) in the ferrule insertion hole 431 from the end part to an opposite end part, and is divided into two portions opposed to each other by the expanding slot 437 with the expanding slot 437 between.

The expanding slot 437 defines a part of the ferrule insertion hole 431, namely, the end part of the sleeve part 433 up and down as an upper (one) press part 436 and a lower (the other) fixing portion where the fixing part 434 is formed continuously. A press force F in a direction orthogonal to the axial direction of the ferrule insertion hole 431 by an operation member installed in the retainer base part (not shown) acts on the upper press part 436. The press part 436 can be displaced in the center direction by the press force F and presses the peripheral surface of the ferrule 10 inserted into the ferrule insertion hole 431. Others are configured as in embodiment 1-1.

When the press part 436 is displaced by the press force F, the inner face of the press part 436 presses the peripheral surface (top surface) of the ferrule 10 inserted into the ferrule insertion hole 431, thereby fixedly retaining the ferrule 10 in the ferrule insertion hole 431. On the other hand, the fixing part 434 is detached from the retainer base part and the retention member 430 is replaced in response to the abrasion degree of the inner face of the ferrule insertion hole 431 with repetitive retention of the ferrule 10.

An embodiment of a ferrule retainer according to a second aspect of the invention will be discussed with the accompanying drawings.

Embodiment 2-1

Figure 8:
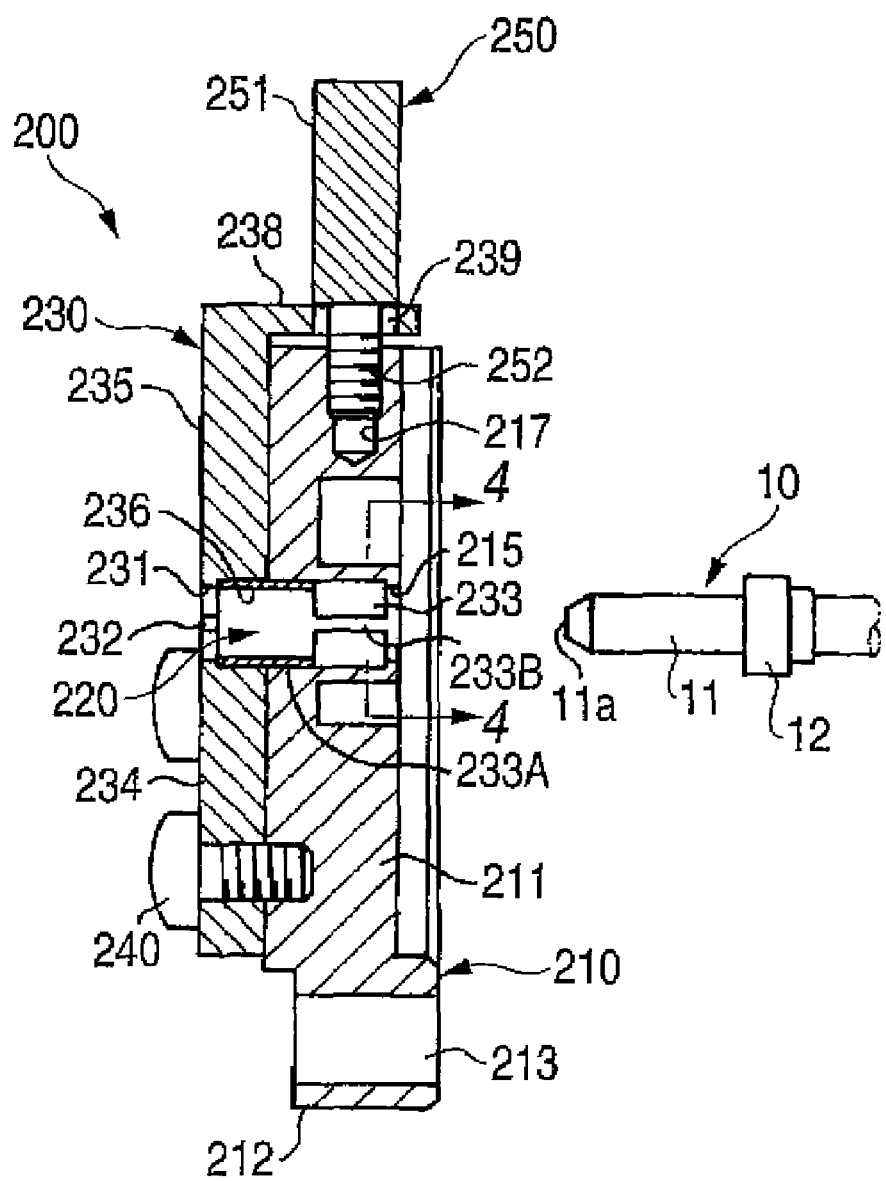
FIG. 8 is a sectional view of an optical fiber ferrule retainer according to embodiment 2-1 of the invention.
Figure 9:
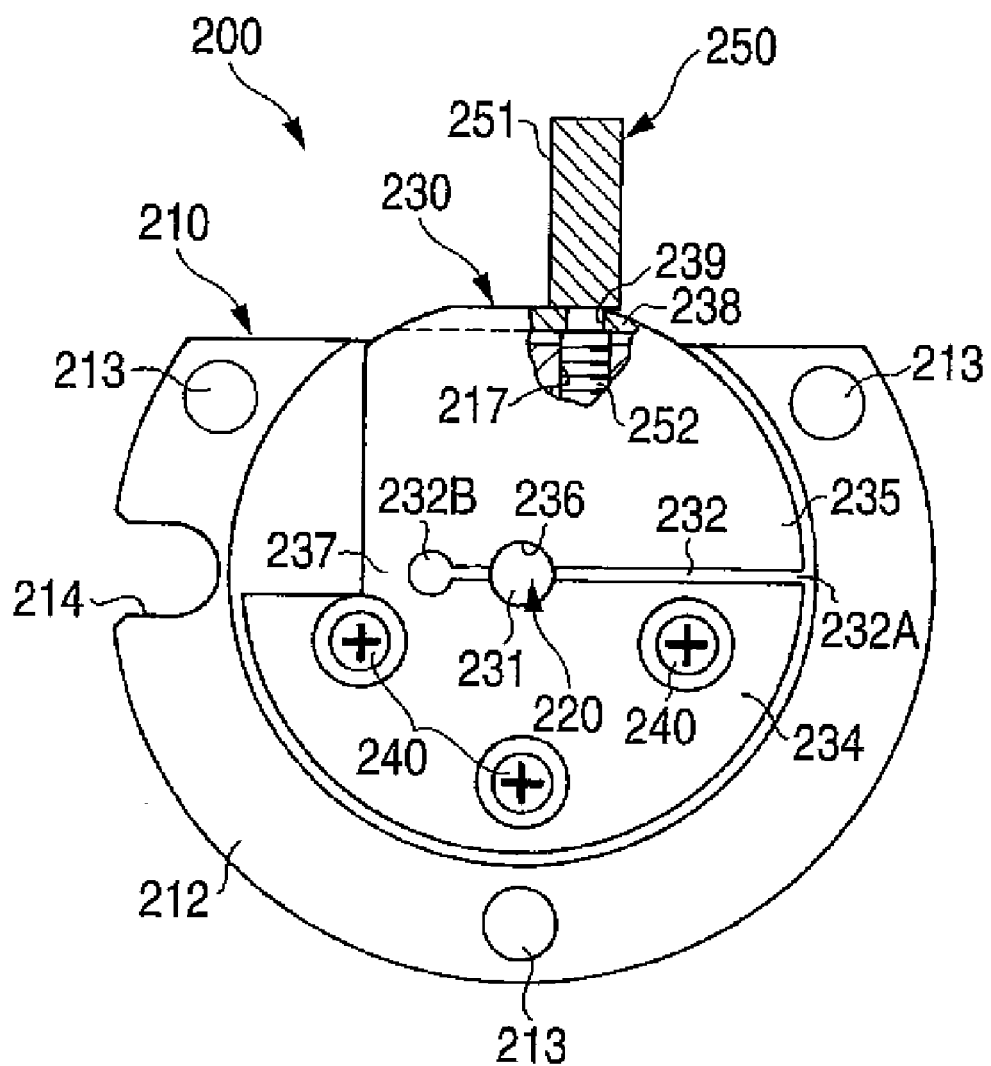
FIG. 9 is a front view of the optical fiber ferrule retainer shown in FIG. 8.
Figure 10:
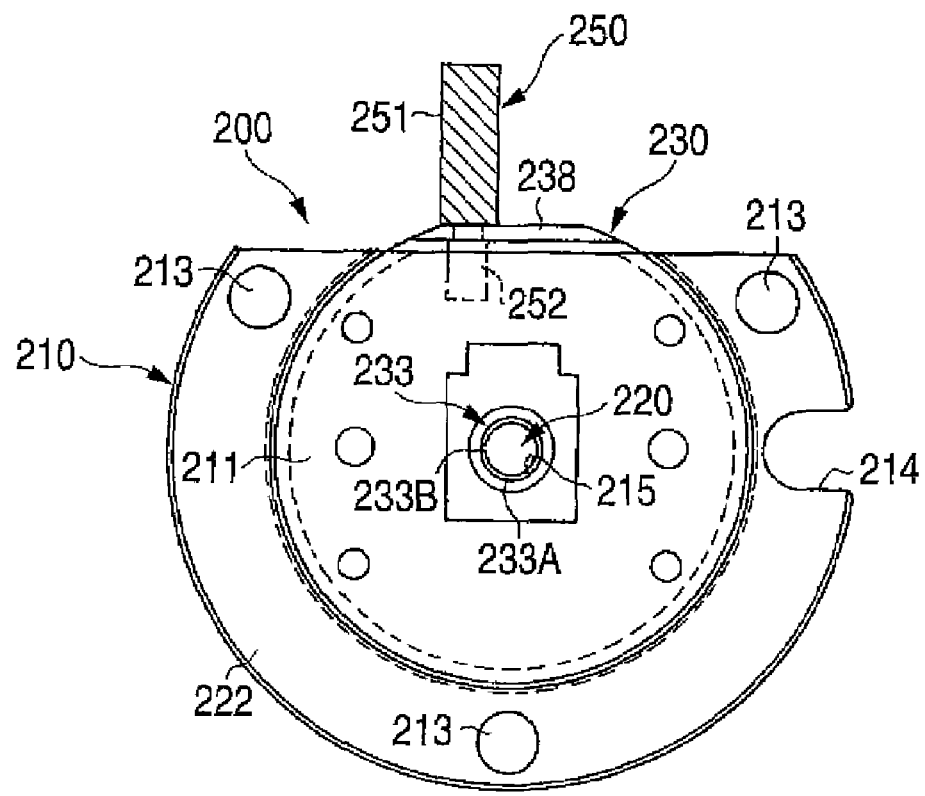
FIG. 10 is a rear view of the optical fiber ferrule retainer shown in FIG. 8.
Figure 11:
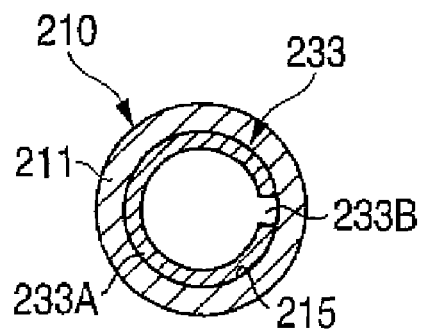
FIG. 11 is a sectional view taken on line 4-4 in FIG. 8.

FIG. 8 is a sectional view of an optical fiber ferrule retainer according to embodiment 2-1 of the invention, FIG. 9 is a front view of the optical fiber ferrule retainer, FIG. 10 is a rear view of the optical fiber ferrule retainer, and FIG. 11 is an enlarged sectional view taken on line 4-4 in FIG. 8. In FIG. 8, only a part of a split sleeve is shown as a sectional view.

A ferrule retainer 200 shown in the figures retains a ferrule 10 fixedly secured to an end part of an optical fiber shown in FIG. 8 at a predetermined position in front of an object lens unit of a microinterferometer not shown. The left of FIG. 8, namely, the front shown in FIG. 9 is a face attached to a microinterferometer, and the ferrule 10 is inserted from the right of FIG. 8, namely, the rear shown in FIG. 10. A configuration example of the microinterferometer is described in detail in JP-A-2005-69697. Therefore, refer to JP-A-2005-69697.

The ferrule 10 shown in FIG. 8 forms a part of an optical connector joined to a mated plug (not shown) through a sleeve (not shown); usually it is housed in a plug of the optical connector. The ferrule 10 retains one end part of an optical fiber (not shown) of single mode type at the center of the outer diameter of a ferrule main body 11, and a holder 12 for housing the ferrule 10 in the plug of the optical connector is attached to the ferrule main body 11. The ferrule main body 11 is made of zirconia ceramic and has a tip end face 11a subjected to PC polishing like a convex so as to easily come in intimate contact with the tip end face of a mated ferrule not shown, and the shape accuracy of the tip end face 11*a* is analyzed with the microinterferometer.

The ferrule retainer 200 of the embodiment includes a retainer main body 210 made of a circular plate-like member and a clamp member 230 detachably attached to the retainer main body 210 from the front, has a ferrule insertion hole 220 for fixing the ferrule at the center (when shown in the figure, the ferrule insertion hole 220 is formed in a split sleeve 233 described later), and retains the ferrule 10 with the ferrule 10 inserted in the axial direction. The retainer main body 210 includes a displacement adjustment part 250 for performing clamp operation.

The retainer main body 210 has a disk part 211 in the center with a part of the top broken and an outer peripheral margin 212 shaped roughly like an annular ring (with the top broken), which are formed in one piece, and a disk-like rotation regulation plate (not shown) is attached to the center of the rear of the disk part 211.

As shown in FIGS. 9 and 10, the margin 212 includes tapped holes 213 (three in the figures) and a recess part 214 for positioning. Each tapped hole 213 is used for an attaching screw for attaching the ferrule retainer 200 to a microinterferometer, and the recess part 214 is formed for engagement with a positioning pin.

As shown in FIG. 8, the clamp member 230 detachably attached to the front of the retainer main body 210 is shaped roughly like a disk (a part of the left part is broken in FIG. 9) and has a retention hole 231 opened on the extension of the ferrule insertion hole 220 at the center.

One end of the above-mentioned split sleeve 233 is placed in the retention hole 231 of the clamp member 230. As the split sleeve 233, a part for coming in contact with the ferrule 10 inserted into the ferrule insertion hole 220 is formed as a separate member. The split sleeve 233 has a vertical split groove 233B in the axial direction in a part of a cylinder 233A.

The split sleeve 233 has an opposite end inserted into a through hole 215 at the center of the retainer main body 210 and both ends retained stepwise as a removal prevention structure. This means that the split sleeve 233 has the one end secured in the step at the front of the retention hole 231 of the clamp member 230 and the opposite end secured in the step at the rear of the through hole 215 of the retainer main body 210.

The inner diameter of the split sleeve 233 is smaller than the inner diameter of the retention hole 231 and the inner diameter of the through hole 215 and the ferrule 10 is inserted so as to come in contact with the inner peripheral surface of the split sleeve 233. The inner diameter in a release state of the split sleeve 233 of the clamp member 230, namely, the ferrule insertion hole 220 has an inner diameter larger than the outer diameter of the ferrule 10 and is adapted to support the inserted ferrule 10 by the inner face of the split sleeve 233.

The clamp member 230 has a notch groove 232 piercing the clamp member 230 from the surface to the back and extending in two radiation directions (in the figure, horizontal diametric direction) from the retention hole 231. The notch groove 232 has one end opened at an open end 232A of one side of the clamp member 230 and an opposite end closed at a closed end 232B shaped like a circular hole opposite to the open end 232A with the retention hole 231 between.

The notch groove 232 separates the clamp member 230 into two opposed members, namely, a fixing part 234 of a lower part in the figure and a displacement part 235 of an upper part in the figure with the notch groove 232 between. The fixing part 234 is fixed to the retainer main body 210 so as not to move with respect to the center position of the ferrule insertion hole 220. On the other hand, the displacement part 235 can be displaced so that the groove width of the notch groove 232 is expanded or shrunken with a thin portion 237 of an extension of the closed end 232B of the notch groove 232 as the center. To facilitate the displacement of the displacement part 235, the clamp member 230 of the extension of the closed end 232B is cut from the outer peripheral portion so that the dimension of the thin portion 237, namely, the distance from the closed end 232B to an end part of the clamp member 230 lessens.

The retention hole 231 of the displacement part 235 is formed in the inner peripheral portion with a ferrule press part 236 for clamping the tip part of the ferrule 10 inserted into the tip part of the split sleeve 233 with displacement toward the fixing part 234 by the inner face of the split sleeve 233. That is, the split sleeve 233 is pressed and deformed so that the inner diameter of the split sleeve 233 lessens between the displacement part 235 and the fixing part 234, and the ferrule press part 236 based on the inner face presses and retains the tip part of the ferrule 10 so as to clamp it; the ferrule press part 236 causes a press force to act on while maintaining the parallel state of the center axis on the plane parallel with the center axis from the direction orthogonal to the center axis without causing a press force bending the center axis of the ferrule 10 (the optical axis falls) to act.

The clamp member 230 is assembled as follows: The one end of the split sleeve 233 is fitted into the through hole 215 at the center of the retainer main body 210 and the clamp member 230 is attached to the front of the retainer main body 210 so that the tip part of the split sleeve 233 projected from the through hole 215 is inserted into the retention hole 231. The fixing part 234 is fastened with setting screws 240 (in FIG. 9, three) from the front for attachment to the retainer main body 210.

On the other hand, the fixing part 234 is detached from the retainer main body 210 and the split sleeve 233 of the clamp member 230 is replaced in response to the abrasion degree of the inner face of the ferrule insertion hole 220, namely, the split sleeve 233 with repetitive retention of the ferrule 10.

Next, the retainer main body 210 is provided with the displacement adjustment part 250 for adjusting the displacement amount of the displacement part 235, namely, the displacement amount of the displacement part 235 brought toward or away from the fixing part 234. The displacement part 235 of the clamp member 230 is formed in an end part at a distance from the notch groove 232 with a securing piece 238 bent to the back in parallel with the notch groove 232 and extending to the top of the retainer main body 210. The displacement adjustment part 250 is secured in the securing piece 238. The displacement adjustment part 250 also serves as a clamp operation member and includes a screw shaft 252 at the tip of a knob part 251 for rotation operation. The screw shaft 252 is screwed into a tapped hole 217 of the retainer main body 210 through a penetrating hole 239 of the securing piece 238.

As the screw shaft 252 is screwed into the tapped hole 217 of the retainer main body 210 with fastening rotation operation of the knob part 251 in the displacement adjustment part 250, the knob part 251 gives a press force to the displacement part 235 for pressing the securing piece 238 to the side of the retainer main body 210, namely, in the direction in which the width of the notch groove 232 becomes narrow, in the direction orthogonal to the axial direction of the ferrule insertion hole 220. An external force for displacing a ferrule press part 236 of the clamp member 230 is given through displacing of the displacement part 235.

The displacement adjustment part 250 is installed at a position leaning to the side of the open end 232A of the notch groove 232 from the extension of the center position of the retention hole 231 of the clamp member 230, as shown in FIG. 9. If the press force applying position to the displacement part 235 by the displacement adjustment part 250 is set to a leaning position from the center of the retention hole 231, the press force can be decreased, the displacement adjustment part 250 can be miniaturized and simplified, press force amount adjustment is also facilitated, and occurrence of ferrule damage caused by the action of an excessive press force can be prevented.

The position where the press force of the displacement adjustment part 250 is caused to act may be any if it is a position where the displacement part 235 acts so that the groove width of the notch groove 232 narrows. To make displacement possible by a small press force, preferably the position is a position near to the open end 232A of the notch groove 232 and at a distance from the thin portion 237 at the center of the displacement.

To facilitate operation of the displacement adjustment part 250 or to stipulate the manipulated variable, the displacement adjustment part 250 may be provided with an upright lever and the move range of the lever may be regulated to a clamp position and a release position by installing a pin, etc. For a specific structure of the mechanism, refer to JP-A-2005-69697.

A tip opening of the ferrule insertion hole 220 (the left end part in FIG. 8) becomes an observation hole for observing the tip end face 11a of the ferrule 10 inserted into the ferrule insertion hole 220. When the ferrule retainer 200 is set in a microinterferometer, the opening (hole) is positioned at the front of an object lens unit.

The ferrule retainer 200 of the embodiment retains the ferrule 10 by the clamp member 230 as follows: First, the displacement adjustment part 250 is operated to a release position. At this time, the displacement part 235 is maintained in a no-displacement state, namely, in a state in which the spacing of the notch groove 232 widens. Next, from the tip side of the ferrule 10, the ferrule 10 is inserted into the ferrule insertion hole 220 of the split sleeve 233 of the ferrule retainer 200 and is set.

Next, the displacement adjustment part 250 is operated to a clamp position. At this time, the displacement part 235 is pressed by the displacement adjustment part 250, is brought close to the fixing part 234, and is displaced in the direction in which the groove width of the notch groove 232 becomes small. As the displacement part 235 is thus displaced, the split sleeve 233 becomes deformed so that the inner diameter of the split sleeve 233 lessens, and the ferrule press part 236 presses the tip portion of the ferrule 10 in a direction at right angle to the insertion direction of the ferrule 10 and retains the ferrule 10 so that the ferrule 10 is not detached. The tip end face 11a of the ferrule 10 is retained at a predetermined position as a predetermined attitude with high accuracy.

To release the retention of the ferrule 10, the displacement adjustment part 250 is operated in an opposite direction. At this time, the displacement part 235 pressed by the displacement adjustment part 250 is released in response to a back move of the displacement adjustment part 250 and is displaced in the direction in which the groove width of the notch groove 232 widens. As the displacement part 235 is thus displaced, the inner diameter of the split sleeve 233 widens, the tip portion of the ferrule 10 pressed by the ferrule press part 236 is released, and it is made possible to detach the ferrule 10 from the ferrule insertion hole 220.

In the embodiment, the tip of the ferrule 10 inserted into the ferrule insertion hole 220 is pressed over a predetermined range from the direction orthogonal to the axial direction of the ferrule 10, whereby the tip of the ferrule 10 does not receive the force in the falling direction of the tip and the analysis accuracy of the tip end face 11a of the ferrule 10 becomes good. That is, if the tip end face 11a of the ferrule 10 is displaced so as to fall, the center position of the fiber on the tip end face 11a of the ferrule 10 deviates, affecting a measurement error. In contrast, in the invention, falling of the tip end face 11a of the ferrule 10 with the pressing lessens, deviation of the center position of the fiber is small, the retention accuracy is high, and the measurement error lessens.

Other embodiments of the invention will be discussed. In the embodiments described above, the split sleeve 233 installed as a separate member is installed so that the part coming in contact with the ferrule 10, namely, the abrasion part is only the split sleeve 233, and is replaced in a predetermined abrasion degree, so that abrasion is handled at a low cost and the retention accuracy is ensured. However, an embodiment wherein the split sleeve 233 is not installed is also contained in the invention.

Although not specifically shown, in FIGS. 8 to 11, when the split sleeve 233 is removed, the through hole 215 at the center of the retainer main body 210 is formed without having a step and the inner diameter of the through hole 215 is provided as the dimension equivalent to the outer diameter of the ferrule 10 to form the ferrule insertion hole 220. For the retention hole 231 of the clamp member 230, the step structure to retain the split sleeve 233 is eliminated as a flat inner peripheral surface to form the ferrule press part 236 for pressing and fixing the tip of the ferrule 10.

The tip of the ferrule 10 inserted into the ferrule insertion hole 220 of the retainer main body 210 projects by a predetermined amount from the front end face of the retainer main body 210 and this portion is pressed and retained by the ferrule press part 236 displaced by displacing of the displacement part 235. Also in the embodiment wherein the split sleeve 233 is not included, the tip of the ferrule 10 can be retained reliably and well with high accuracy without falling the optical axis.

If the split sleeve 233 is not included, as replacement and retention of the ferrule 10 are repeated, an abrasion occurs in the part of the ferrule insertion hole 220 and on the inner peripheral surface (ferrule press part 236) of the retention hole 231 of the clamp member 230 coming in contact with the ferrule 10, and the ferrule retention accuracy is degraded. In this case, it may become necessary to replace both or either of the clamp member 230 and the retainer main body 210.

While the embodiments according to the first and second aspects of the invention have been described, it is to be understood that the invention is not limited to the specific embodiments described above and various modifications may be made.

For example, in the embodiments described above, the ferrule retainer retains the ferrule having the tip end face subjected to PC polishing, but can also retain a ferrule having a tip end face polished to a flat face perpendicular to the optical axis or a ferrule having a tip end face polished to a flat face oblique to the optical axis.

In embodiment 2-1 described above, the notch groove is formed so as to extend linearly from one end to an opposite end, but can also be formed so as to extend like a letter V with the retention hole as an apex.

As the ferrule retained in the ferrule retainer, the ferrule in a state in which it is taken out from a plug of an optical connector (the case shown in the figure) is retained and the ferrule to which a part of a plug of an optical connector is attached is retained. To meet each case, a recess relief structure to avoid interference with the plug, etc., is installed, whereby it is made possible to retain the ferrule.

Further, in the embodiments described above, the ferrule is made of zirconia ceramic and retains an optical fiber of single mode type in the shaft center part, but may be formed of any other material of stainless steel, plastic, etc., and the retained optical fiber may be of multimode type.

The use of the ferrule retainer of the invention is not limited to a microinterferometer; the ferrule retainer can be used to retain a ferrule at a predetermined position, etc., in other devices used for examination of a ferrule, etc.

As described above, the optical fiber ferrule retainer according to the first aspect of the invention retains a ferrule in a state in which the ferrule is inserted into the ferrule insertion hole for fixing the ferrule. The retention member replaceably attached to the retainer base part has the tubular sleeve part and the fixing part formed in one piece, the ferrule insertion hole formed piercing, the split groove, and the press part for being displaced so as to be able to press the peripheral surface of the ferrule, and retains the ferrule inserted into the ferrule insertion hole by pressing the press part by the operation member of the retainer base part, and the fixing part can be removed from the retainer base part for detachably replacing the retention member.

In the optical fiber ferrule retainer according to the first aspect of the invention, if the ferrule retention accuracy of the ferrule retainer is degraded due to an abrasion in the insertion end part accompanying insertion of the ferrule in the ferrule insertion hole and an abrasion accompanying pressing of the press part for retaining the ferrule, the retainer base part having the operation member, etc., is left and only the portion of the retention member forming the ferrule insertion hole, so that the replacement cost can be reduced and the stable retention accuracy can be maintained over a long term.

That is, an abrasion occurs in the ferrule insertion hole in response to repeated retention of the ferrule with an increase in the examination amount and the retention member is replaced in response to the abrasion degree, so that the component cost is decreased, scheduled replacement is made possible, the ferrule retention accuracy can be maintained, and it is made possible to ensure the good analysis accuracy as compared with replacement of the whole of the ferrule retainer.

As described above, the optical fiber ferrule retainer according to the second aspect of the invention retains a ferrule in a state in which the ferrule is inserted into the ferrule insertion hole for fixing the ferrule. The optical fiber ferrule retainer includes the clamp member for retaining the tip of the ferrule projected from the retainer main body having the ferrule insertion hole. The clamp member includes the notch groove extending in two radiation directions from the retention hole opened on the extension of the ferrule insertion hole with one end opened at an open end of one side of the clamp member and an opposite end closed at a closed end for separating the fixing part and the displacement part opposed thereto. The retainer main body includes the displacement adjustment part for adjusting the displacement amount of the displacement part, and the displacement part includes in the inner peripheral part of the retention hole, the ferrule press part for moving toward or away from the inner peripheral part of the retention hole of the fixing part by action of the displacement adjustment part and pressing the tip of the ferrule from the direction orthogonal to the axial direction of the ferrule.

In the optical fiber ferrule retainer according to the second aspect of the invention, the displacement part is displaced so that displacement of the ferrule press part of the displacement part presses from the direction orthogonal to the axial direction of the ferrule, whereby displacement such that the optical axis of the ferrule tip falls with the press operation does not occur and the direction of the ferrule tip end face is retained without being displaced. Accordingly, the center position of the measurement tip end face does not change, the retention accuracy is improved, and measurement can be well conducted.

If the separate component coming in contact with the ferrule is made replaceable, for degradation of the ferrule retention accuracy of the ferrule retainer caused by an abrasion in the insertion end part accompanying insertion of the ferrule in the ferrule insertion hole and an abrasion accompanying pressing of the press part for retaining the ferrule, the retainer main body having the displacement adjustment part, etc., is left and only the portion of the clamp member forming the ferrule insertion hole, the replacement cost can be reduced, and the stable retention accuracy can be maintained over a long term.

If the separate component is the split sleeve and the split sleeve coming in contact with the ferrule is replaced, the whole portion coming in contact with the ferrule can be replaced by replacing the split sleeve, so that when a large number of ferrules are repeatedly retained and an abrasion occurs, the replacement cost can be decreased and a long-term measurement accuracy can be maintained by conducting scheduled replacement, etc.

If the press force applying position to the displacement part by the displacement adjustment part is set to a leaning position from the center of the retention hole, the press force can be decreased, the displacement adjustment part can be miniaturized and simplified, press force amount adjustment is also facilitated, and occurrence of ferrule damage caused by the action of an excessive press force can be prevented.

Further, if the fixing part and the displacement part is joined through the thin part, displacement of the displacement part is facilitated, the required press force for the displacement adjustment part is decreased, and miniaturization and simplification can be accomplished.

The entire disclosure of each and every foreign patent application from which the benefit of foreign priority has been claimed in the present application is incorporated herein by reference, as if fully set forth.

What is claimed is:

1. An optical fiber ferrule retainer for retaining a ferrule fixed to an end part of an optical fiber in a state in which the ferrule is inserted into a ferrule insertion hole for fixing the ferrule in an axial direction of the ferrule insertion hole,
the optical fiber ferrule retainer comprising: a retainer base part; and a retention member replaceably attached to the retainer base part,
wherein the retention member comprises:
a tubular sleeve part and a fixing part fixed to the retainer base part, the tubular sleeve part and the fixing part being formed in one piece;
the ferrule insertion hole formed piercing the sleeve part and the fixing part;
a split groove formed in an axial direction of the ferrule insertion hole or in a circumferential direction orthogonal to the axial direction; and
a press part that is displaced so as to be able to press a peripheral surface of the ferrule inserted into the ferrule insertion hole with a partial inner face of the ferrule insertion hole defined by the split groove,
wherein the retainer base part comprises an operation member that applies an external force for displacing the press part of the retention member, and wherein while the ferrule inserted into the ferrule insertion hole is retained by pressing of the press part, the fixing part can be removed from the retainer base part so as to detachably replace the retention member.

2. The optical fiber ferrule retainer as claimed in claim 1, wherein the retention member comprises:
the split groove formed toward the axial direction from an end part opposite to a ferrule insertion end part in the ferrule insertion hole;
a plate-like displacement member provided continuously extending in a direction orthogonal to the axial direction of the ferrule insertion hole in the press part of one defined by the split groove; and
the fixing part that is plate-like and is continuously provided extending in an opposite direction to the displacement member in the other part defined by the split groove, opposed to the press part,
wherein a press external force parallel with the axial direction of the ferrule insertion hole by the operation member acts on an end face of the displacement member on the side of the sleeve part.

3. The optical fiber ferrule retainer as claimed in claim 1, wherein the retention member comprises:
the split groove formed in a circumferential direction orthogonal to the axial direction in the proximity of an end opposite to an ferrule insertion end part in the ferrule insertion hole;
a plate-like displacement member provided continuously extending in a direction orthogonal to the axial direction of the ferrule insertion hole in the press part defined by the split groove and positioned at an end part from the split groove; and
the fixing part that is plate-like and is continuously provided extending in an opposite direction to the displacement member in the part opposed to the press part and not formed with the split groove,
wherein a tension external force parallel with the axial direction of the ferrule insertion hole by the operation member acts on the end face of the displacement member on the side of the sleeve part.

4. The optical fiber ferrule retainer as claimed in claim 1, wherein the retention member comprises:
the fixing part continuously provided in an end part opposite to an ferrule insertion end part in the ferrule insertion hole of the sleeve part; and
the split groove formed toward the axial direction from the ferrule insertion end part of the sleeve part,
wherein the sleeve part of one defined by the split groove is formed in the press part, and
wherein a press external force in a direction orthogonal to the axial direction of the ferrule insertion hole by the operation member acts on the press part.

5. The optical fiber ferrule retainer as claimed in claim 1, wherein the retention member comprises the split groove formed toward the axial direction from an opposite end to an ferrule insertion end part in the ferrule insertion hole,
wherein the sleeve part of one defined by the split groove is formed in the press part and a press external force in a direction orthogonal to the axial direction of the ferrule insertion hole by the operation member acts on the press part, and
wherein the plate-like fixing part is continuously provided in the other part defined by the split groove, opposed to the press part.

6. An optical fiber ferrule retainer for retaining a ferrule fixed to an end part of an optical fiber in a state in which the ferrule is inserted into a ferrule insertion hole for fixing the ferrule in an axial direction of the ferrule insertion hole,
the optical fiber ferrule retainer comprising: a retainer main body having the ferrule insertion hole; and a plate-like clamp member, attached to the retainer main body, that retains a tip of the ferrule projected from the retainer main body,
wherein the clamp member comprises:
a retention hole opened on an extension of the ferrule insertion hole;
a notch groove extending in two radiation directions from the retention hole with one end opened at an open end of one side of the clamp member and an opposite end closed at a closed end;
a fixing part separated by the notch groove and fixed to the retainer main body; and
a displacement part being opposed to the fixing part and displaced with the closed end portion of the notch groove as a center,
wherein the retainer main body comprises a displacement adjustment part that adjusts a displacement amount of the displacement part, and
wherein the displacement part comprises, in an inner peripheral part of the retention hole, a ferrule press part that moves toward or away from the inner peripheral part of the retention hole of the fixing part by action of the displacement adjustment part and presses the tip of the ferrule inserted into the ferrule insertion hole of the retainer main body from a direction orthogonal to an axial direction of the ferrule.

7. The optical fiber ferrule retainer as claimed in claim 6, wherein the clamp member comprises a separate component that is replaceable and comes in contact with the ferrule.

8. The optical fiber ferrule retainer as claimed in claim 7, wherein the separate component is a split sleeve in which a vertical split groove is formed in an axial direction in a part of a cylinder, and
the split sleeve is extended and placed in a portion of the ferrule insertion hole of the retainer main body.

9. The optical fiber ferrule retainer as claimed in claim 6, wherein a press force applying position to the displacement part by the displacement adjustment part is a position leaning to the open end of the notch groove from the center position of the retention hole.

10. The optical fiber ferrule retainer as claimed in claim 6, wherein in the clamp member, the displacement part and the fixing part are joined through a thin part in the proximity of the open end of the notch groove and the displacement part can be displaced relative to the fixing part with the thin part as a center.

* * * * *